US009473780B2

(12) United States Patent
Nelson et al.

(10) Patent No.: US 9,473,780 B2
(45) Date of Patent: Oct. 18, 2016

(54) VIDEO TRANSMISSION USING CONTENT-BASED FRAME SEARCH

(75) Inventors: Alex Tremain Nelson, Portland, OR (US); Richard E. Crandall, Portland, OR (US)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 13/549,374

(22) Filed: Jul. 13, 2012

(65) Prior Publication Data

US 2014/0016696 A1    Jan. 16, 2014

(51) Int. Cl.
| | |
|---|---|
| *H04N 19/20* | (2014.01) |
| *H04N 19/103* | (2014.01) |
| *H04N 19/105* | (2014.01) |
| *H04N 19/152* | (2014.01) |
| *H04N 19/172* | (2014.01) |
| *H04N 19/50* | (2014.01) |
| *H04N 5/225* | (2006.01) |
| *G06K 9/00* | (2006.01) |
| *G06F 7/04* | (2006.01) |
| *G06T 9/20* | (2006.01) |

(52) U.S. Cl.
CPC ............ *H04N 19/20* (2014.11); *H04N 19/103* (2014.11); *H04N 19/105* (2014.11); *H04N 19/152* (2014.11); *H04N 19/172* (2014.11); *H04N 19/50* (2014.11); *G06T 9/20* (2013.01)

(58) Field of Classification Search
CPC ............ H04N 7/32; H04N 7/50; H04N 5/66; G06T 2210/44; G01S 3/7864
USPC ............ 375/240, 240.12, E07.243; 345/473, 345/646; 348/169, 739; 382/103; 707/500.1; 709/231, 235
See application file for complete search history.

(56) References Cited

U.S. PATENT DOCUMENTS

| | | | |
|---|---|---|---|
| 5,546,129 A | 8/1996 | Lee | |
| 6,356,945 B1 * | 3/2002 | Shaw et al. | 709/231 |
| 6,724,915 B1 | 4/2004 | Toklu et al. | |
| 8,134,596 B2 | 3/2012 | Lei et al. | |
| 8,421,805 B2 * | 4/2013 | Bishop | 345/473 |
| 2011/0182352 A1 | 7/2011 | Pace | |

OTHER PUBLICATIONS

Cootes, T. F., et al., "Active Shape Models—Their Training and Application," Computer Vision and Image Understanding, vol. 61, No. 1, January, pp. 38-59, 1995.

* cited by examiner

*Primary Examiner* — Sath V Perungavoor
*Assistant Examiner* — Patricia I Young
(74) *Attorney, Agent, or Firm* — Blank Rome LLP

(57) ABSTRACT

A system, method and computer-readable medium are disclosed that uses previously transmitted video frames and associated video frame content information to reduce the amount of information to be transmitted from a sending device to a receiving device during a video transmission.

21 Claims, 5 Drawing Sheets

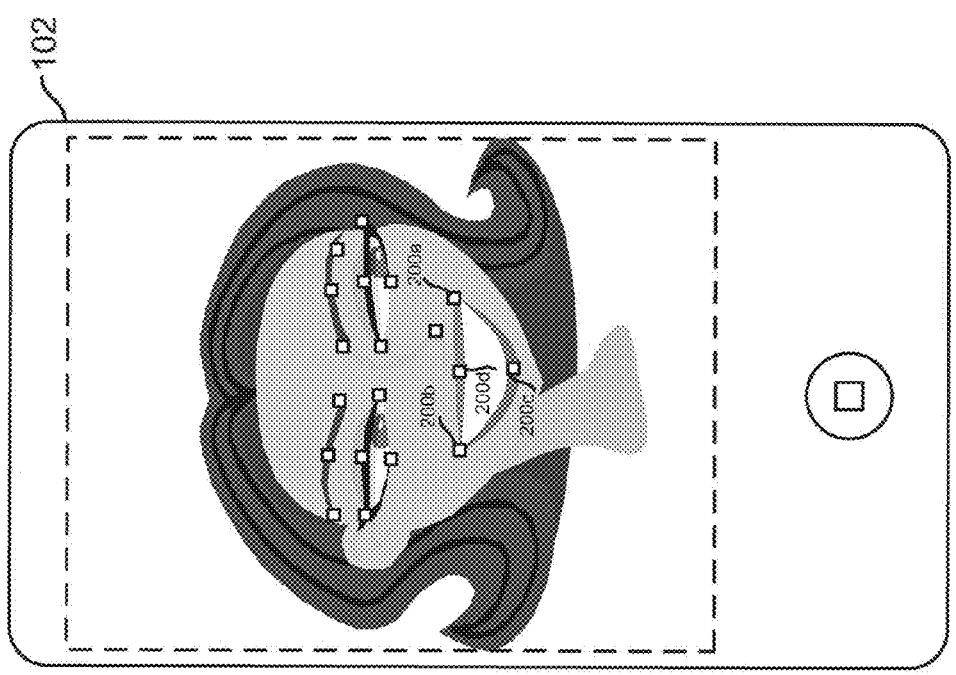

VIDEO TRANSMISSION USING CONTENT-BASED FRAME SEARCH

TECHNICAL FIELD

This disclosure is related generally to video transmission.

BACKGROUND

The use of video transmission has become ubiquitous in modern society and has extended onto mobile platforms on which bandwidth can be low or intermittent. A common use for such video capabilities is live video-conferencing between two or more parties. However, the user experience can be greatly diminished if the available bandwidth falls below a minimal threshold during the call, causing video and/or audio frames to drop.

SUMMARY

A system, method and computer-readable medium are disclosed that uses previously transmitted video frames and associated video frame content information to reduce the amount of information to be transmitted from a sending device to a receiving device during a video transmission.

In some implementations, a method comprises: receiving a set of parameters or coefficients associated with a current video frame of a video transmission, the parameters or coefficients generated from locations of object landmark points characterizing object content in the current video frame; searching a data structure storing previously transmitted video frames of the video transmission; based on the searching, retrieving a previously stored video frame containing similar object content; and replacing the current video frame with the retrieved video frame.

In some implementations, a method comprises: identifying locations of object landmark points in object content in a current video frame of a video transmission, the object landmark points characterizing the object content; generating parameters or coefficients from the locations of the object landmark points; determining a bandwidth condition associated with the video transmission; and transmitting the coefficients or transmitting the coefficients and the current video frame to a receiving device based on the determining.

Other implementations disclosed herein are directed to systems and/or computer-readable mediums.

Particular implementations disclosed herein provide one or more of the following advantages. The disclosed implementations allow video transmissions on mobile devices to appear seamless during low bandwidth conditions.

The details of the disclosed implementations are set forth in the accompanying drawings and the description below. Other features, objects, and advantages will be apparent from the description and drawings, and from the claims.

DESCRIPTION OF DRAWINGS

FIG. 2 illustrates the selection and tracking of a set of object landmark points.

The same reference symbol used in various drawings indicates like elements.

DETAILED DESCRIPTION

Exemplary Video Transmission System

Figure 1:
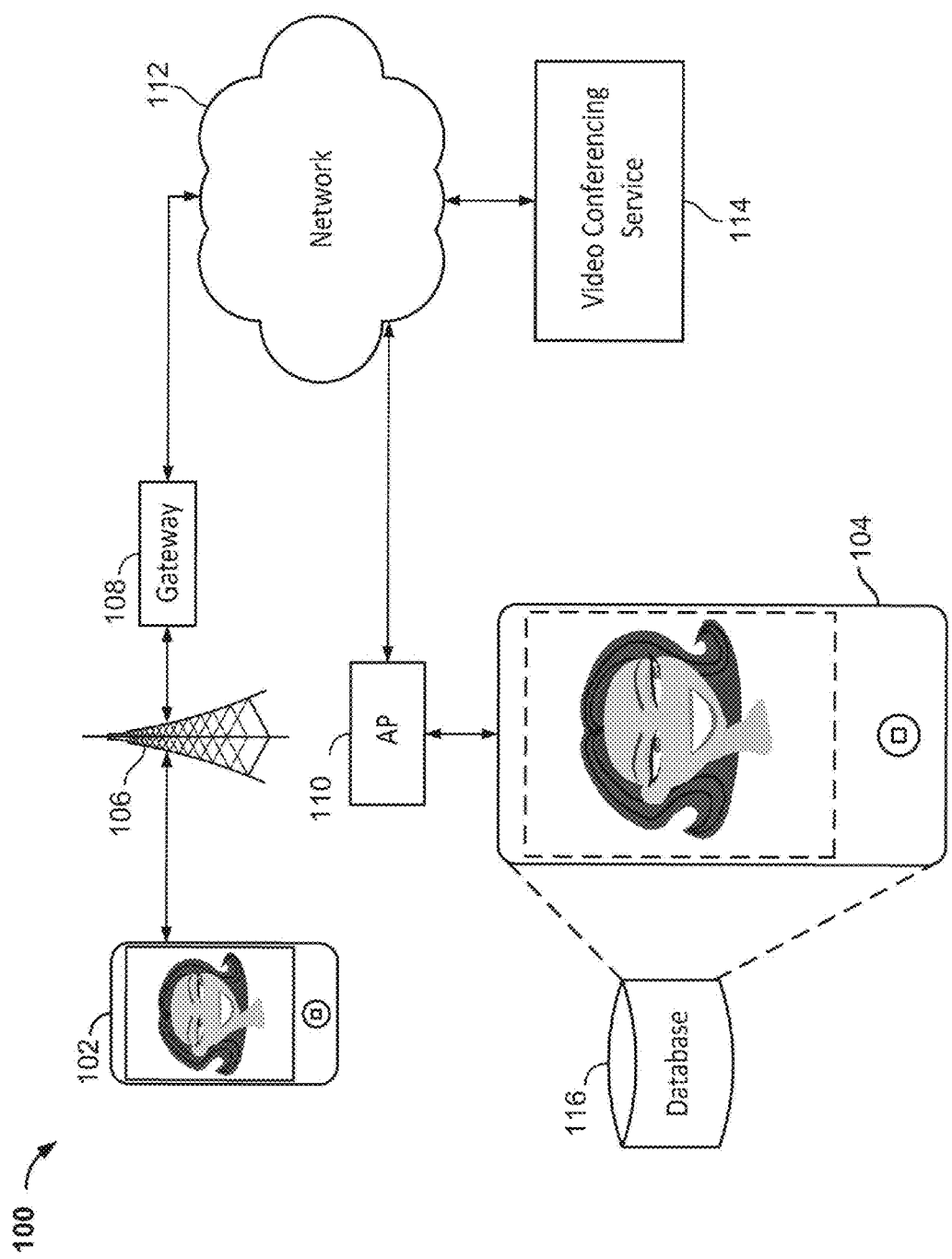
FIG. 1 is block diagram of an exemplary video transmission system for providing video transmission using content-based frame search.

FIG. 1 is block diagram of a video transmission system 100 for providing video transmission using content-based frame search. In some implementations, system 100 can include sending device 102, receiving device 104 and network 112.

Devices 102, 104 can be any device capable of sending or receiving video transmissions, including but not limited to video telephony devices (e.g., smart phones), electronic table devices, video cameras, computers with webcams (including notebook computers with embedded video cameras), videophones, picture phones, etc.

Network 112 can be any combination of networks topologies, such as a Wide Area Network (WAN). An example of a WAN would be the Internet. Another example is the public switched telephone network (PSTN). Network 112 can include any number and types of devices (e.g., routers, hubs, modems, optical devices) for facilitating communications between devices 102, 104, using known video transmission protocols, such the protocols found in the International Telecommunications Union (ITU) H.264, H.320, H.323, H.324, H.331 and V.80 standards.

Users of devices 102, 104 can participate in a video conferencing session with their respective devices. In the example shown, device 102 is sending a video transmission to device 104 over cellular network 106, through gateway 108 and network 112. Device 104 receives the video transmission through access point 110 (e.g., WiFi router) coupled to network 112. Device 104 includes, or has access to, database 116 for storing video frames and corresponding sets of coefficients, as described in reference to FIGS. 2 and 3. In some implementations, videoconferencing service 114 coupled to network 112 can provide video conferencing services for establishing a videoconference between devices 102, 104.

System 100 is one example of a video transmission system. Other transmission systems are also possible with more or fewer components. Although device 102 is referred to in this document as a "sending device" and device 104 is referred to as a "receiving device," both devices can send and receive video transmissions to each other and other devices. Moreover, more than two devices can participate in a video conference session.

Figure 4:
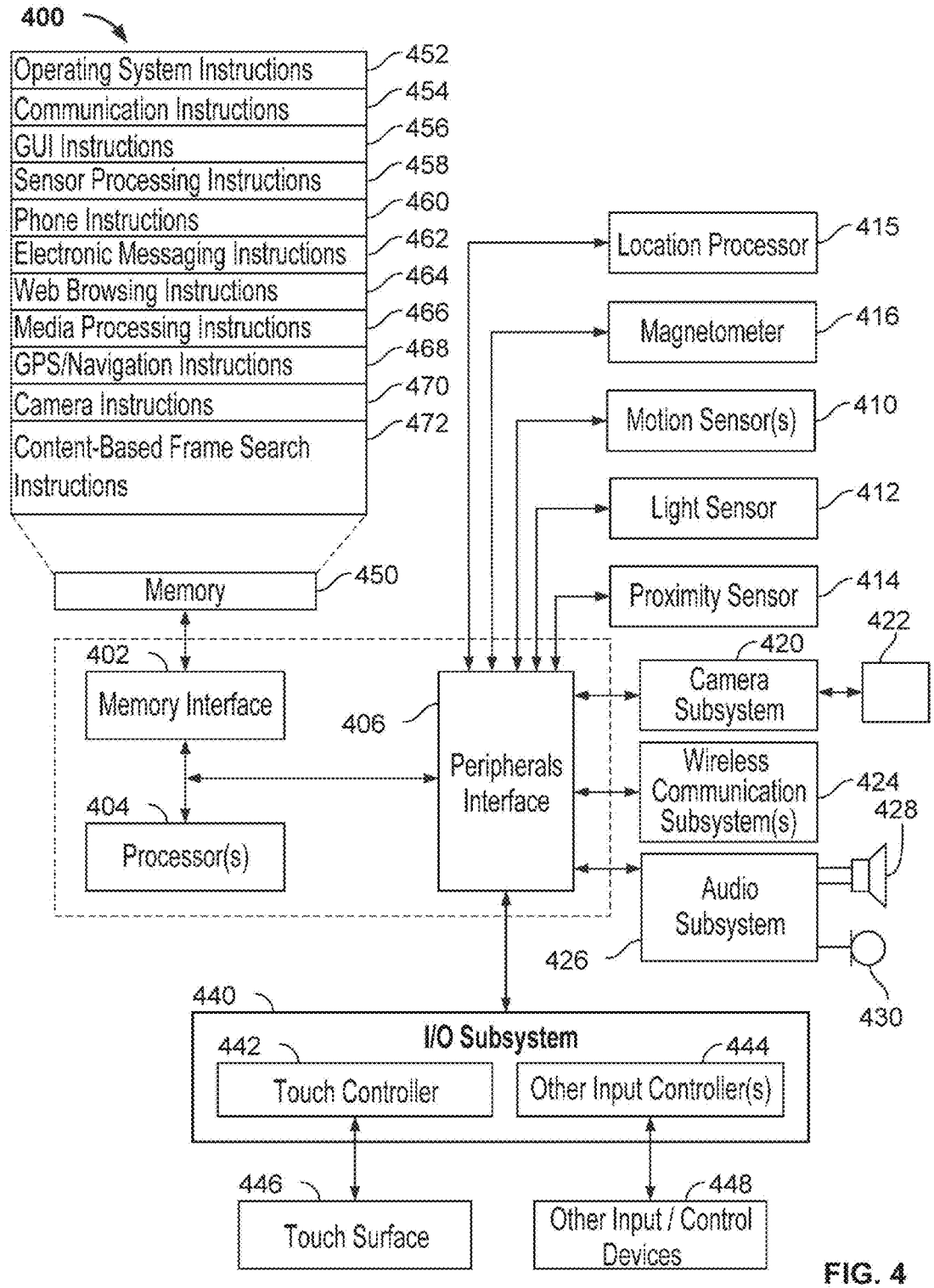
FIG. 4 is a block diagram of an exemplary architecture of a device that implements the features and processes described in reference to FIGS. 1-3.

As described in reference to FIG. 4, devices 102, 104 can include a video camera for capturing an image of a primary object of interest in the video frame (hereafter also referred to as "object content"). The video camera can be embedded in the device or coupled to the device. Devices 102, 104 can include a video codec (e.g., ITU H.261-264) for processing video frames (e.g., compressing video frames) generated by the camera into a format that is compliant with a suitable video transmission protocol (e.g., H.264, H.320, H.323, H.324, H.331 or H.323).

In the example shown, a live video feed is generated by a video camera on device 102. The video feed captures an image of the user (who is facing an embedded camera on the front of the device). As discussed in more detail below, object landmarks are generated for the primary object of interest in the video frame, which in this example is the sender's face. The object landmarks characterize the primary object content of the video frames. For each video frame, locations of the object landmarks within a defined coordinate frame are detected and converted into a set of coefficients that characterize the object content. The set of coefficients and corresponding video frame are stored in database 116 or other data structure of device 104 or stored remotely on, for example, a network device.

During low bandwidth operating conditions in system 100, device 102 computes and sends a set of coefficients for the current video frame of the live video feed to device 104 without sending the current video frame. The set of coefficients is used to search database 116 and to retrieve a previously stored video frame having primary object content that is similar to the primary object content in the current video frame. Because the set of coefficients is smaller than the current video frame, the coefficients can be sent under low bandwidth conditions.

Selecting & Tracking Object Landmarks

FIG. 2 illustrates the selecting and tracking of facial landmark points of a sender's face using device 102. In the example shown, facial landmarks have been assigned to various features of the face, including the eyebrows, eyes, nose and mouth. In the example shown, facial landmark points 200a-200d are selected around the sender's mouth.

In general, landmark points can be selected such that transformations and deformations of the object in the image will affect the position of the landmark points. The position of the landmark points can be defined unambiguously across different examples of the object. In some implementations, the local region in the image around a landmark point has some identifiable features, such as contrast or color that can be used for detection of the landmark point. For example, if hand movements are being tracked landmark points can include the fingertips, the valleys between the fingers and points on either side of each knuckle.

It should be noted that landmark point tracking is one example method for characterizing image content and other methods are also possible. For example, for tracking the human body, other models, typically involving a skeleton of articulated joints can be used in lieu of landmark point tracking.

Each image coming from the camera on device 102 is analyzed for the current locations of the facial landmark points in a reference coordinate frame. For example, normalized image coordinates can be used as a reference frame. Other reference frames can also be used From these locations of facial landmark points a process determines the position, orientation and scale of the face image in the current video frame, as well as a lower-dimensional representation of the face image obtained by, for example, principal component analysis (PCA). The resulting coefficients from the process can be transmitted to receiving device 104 during low bandwidth conditions in system 100. If the bandwidth of system 100 is sufficient, the associated video frame can also be sent to receiving device 104.

The position of a mesh of landmark points can be defined as the arithmetic mean of the landmark point coordinates. The orientation and scale can be defined relative to a reference mesh of landmark points, which can be determined as an average mesh across a hand-labeled database. The orientation and scale can be found by solving for a transformation matrix that minimizes the sum of squared distances between the landmark points in the mesh and landmark points in the reference mesh. This transformation matrix can be solved in closed form and involves the variance and covariance of the landmark point coordinates of the mesh and reference mesh, as described in Cootes, T. F., Taylor, C. J., Cooper, D. H., & Graham, J. 1995. Active shape models-their training and application. Comput. Vis. Image Underst., 61(1), 38-59.

PCA uses eigenvalue decomposition of a covariance matrix formed from a database of hand-labeled and normalized landmark meshes, where each mesh is represented as a single vector of x and y coordinates. The coefficients of the current mesh can be found by projecting its coordinate vector onto some number of the eigenvectors (also called principle components).

While fitting landmark points with an active shape model (ASM) is a suitable method for characterizing image content, other known methods for characterizing image content can be used, including but not limited to an active appearance model (AAM) or other constrained linear model for fitting landmark points. In general, any suitable description of image content can be used instead of landmark points, provided a suitable fitting algorithm is available.

The video frames and associated coefficients received at device 104 can be stored in database 116 for later use. Subsequently, if a set of coefficients is received at device 104 without an accompanying image of the object, then the received coefficients can be used to search database 116 for a similar image of the object to be displayed in place of the current video frame in the video transmission. For example, a database can be a list of coefficient arrays and a list of images. During a search, the distance between the received coefficients and each of the coefficient arrays in the list can be computed. An index of the array with the smallest distance from the received coefficients can be identified and the image at that index can be retrieved from the image list for display.

In some implementations, object landmark points can be extracted from both the received and stored coefficients and used to morph the image of the object so that the image appears more similar to the image of the sender's face captured on device 102. If such morphing is not desired, then only the image index can be transferred rather than the coefficients; however, sending an image index requires that the sending device maintain an equivalent database and image index and perform a search for the most similar image to determine the image index.

In some implementations, the number of frames that can be transmitted at a particular bandwidth can be increased by applying a content-sensitive lossy compression algorithm to each video frame. For example, by using the location of the face as provided by the facial landmark points, the background content in the video frame can be identified and transmitted at first resolution, producing a blurry effect, while the facial content is transmitted at a second resolution that is higher than the first resolution. Alternatively, an image segmentation algorithm can be used to segment the facial content (e.g., body, head and face of the sender) of the video frame from the background content of the video frame, and transmitting the background content at a lower frame-rate than the facial content or not transmitting the background content. In the latter option, the omitted background content can be replaced with a synthetic background content generated at receiving device 104.

In some implementations, low bandwidth videoconferencing can enable multiple users at separate locations to participate in a group videoconference while remaining within stringent bandwidth limitations. In this application, each user can receive frames and coefficients from the other participants in the conference, and can control the image scale at which the other user's faces are displayed. Even users with poor data connections can upload and download a number of video frames, allowing them to participate in the visual aspects of the videoconference.

Exemplary Process

Figure 3A:
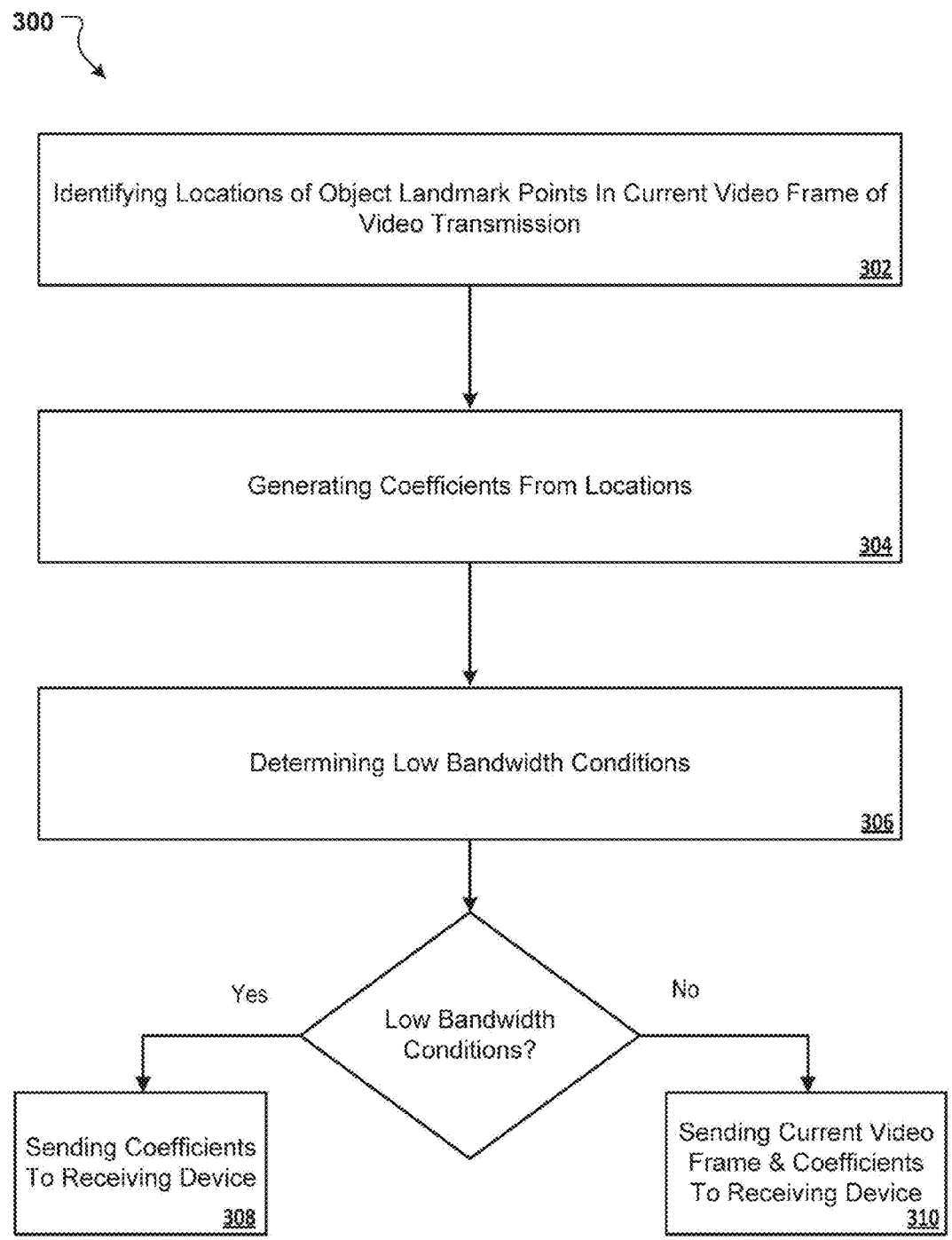
FIGS. 3A and 3B illustrate an exemplary process for video transmission using content-based frame search.

FIG. 3A illustrates an exemplary process 300 for video transmission using content-based frame search performed at a sending device. Process 300 can be performed using system 100 and device architecture 400 as described in reference to FIGS. 1 and 4, respectively.

In some implementations, process 300 can begin by identifying locations of object landmark points in a current video frame of a video transmission from the sender's device (302). The sending device can include a camera that can generate and transmit a live video feed to a receiving device.

Process 300 can generate coefficients from the object landmark point locations that characterize the object content (304). For example, from the facial landmark point locations of a sender's face the position orientation and scale of the sender's face in the current video frame can be determined. These parameters can be further processed using PCA to generate coefficients characterizing the facial content in the current video frame.

Process 300 can continue by determining a low bandwidth condition for the video transmission (306). If there is a low bandwidth condition, then the sending device sends the set of coefficients for the current video frame to the receiving device (308). If there is not a low bandwidth condition, the sending device sends the current video frame and its associated set of coefficients to the receiving device (310).

Figure 3B:
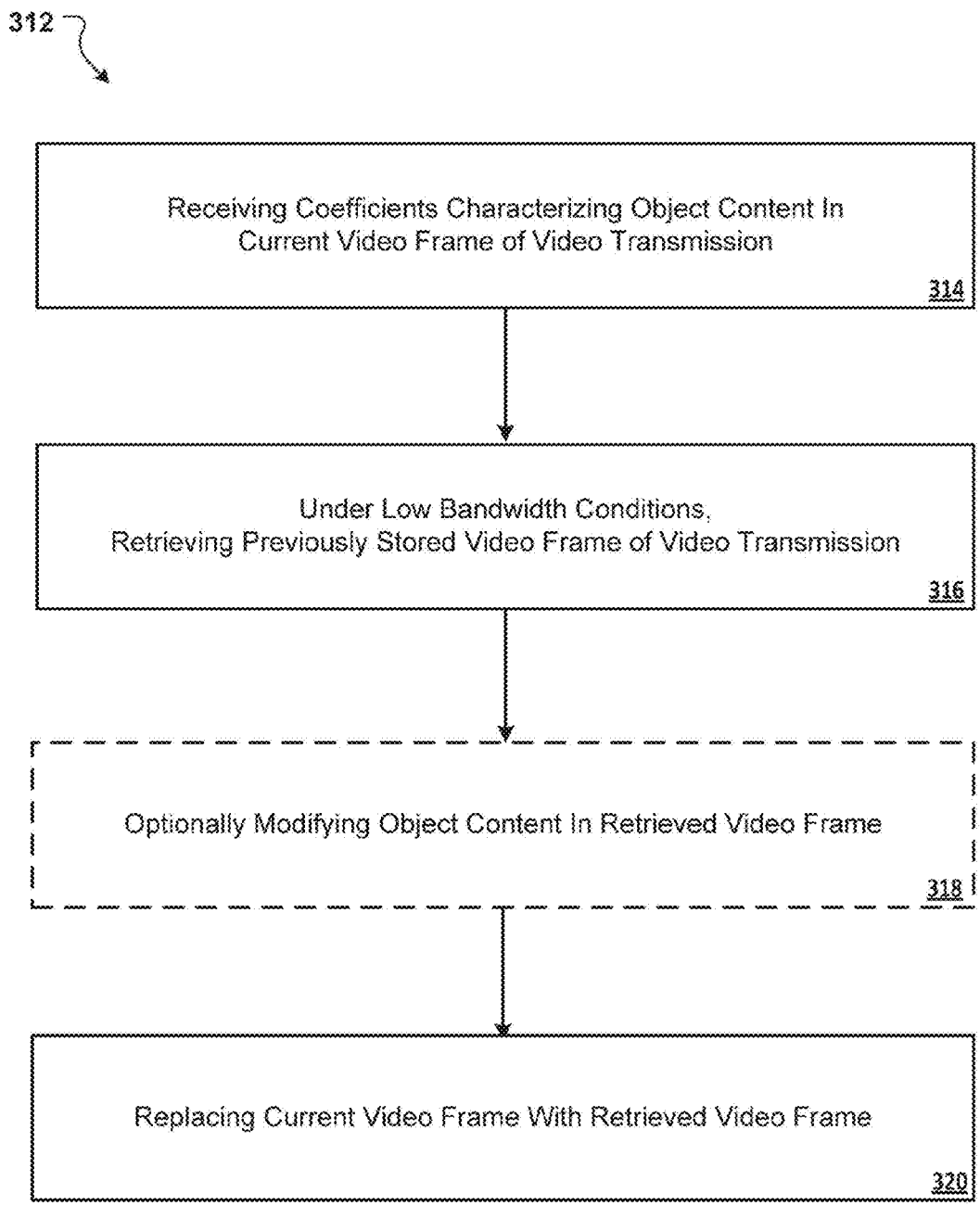

FIG. 3B illustrates an exemplary process 312 for video transmission using content-based frame search performed at a receiving device under low bandwidth conditions. Process 312 can be performed using system 100 and device architecture 400 as described in reference to FIGS. 1 and 4, respectively.

In some implementations, process 312 can begin by receiving a set of coefficients characterizing object content in a current video frame of a video transmission (314). As described in reference to FIG. 3A, if a low bandwidth condition is determined at the sending device, only the set of coefficients associated with the object content is sent to the receiving device.

Process 316 can continue by using the coefficients to search a database of previously stored video frames from the video transmission to find a video frame containing similar object content (316). For example, the best matching video frame can be determined by comparing the received coefficients with the coefficients of each previously stored video frame in the database. The stored video frame having corresponding coefficients that are the most similar to the received coefficients can be retrieved from the database. Similarity of two sets of coefficients can be determined by defining a distance function. For example, the distance function can be a weighted sum of the squared differences between each of the coefficients. The weighting of different components in the sum can be used to reflect the relative importance of the different coefficients, and to account for the differing numerical ranges obtained by those coefficients. For example, the scale parameter may take on different values from the orientation parameter or from the PCA coefficients. The stored coefficients with the smallest value for the distance function can be identified as the most similar to the received coefficients.

Optionally, process 318 can continue by morphing the image in the retrieved video frame using the received and stored coefficients (318). For example, morphing can be performed by generating meshes of landmark points from both the received and stored coefficients, and, given a predetermined triangulation of the mesh, determining the color of each pixel in the morphed image by linearly interpolating within the corresponding triangle in the mesh computed from the stored coefficients.

Process 312 can continue by replacing the current video frame with the retrieved video frame at the receiving device (320).

Processes 300 and 312 described above provide an advantage over conventional video transmission systems by allowing a sending device operating under low bandwidth conditions to send a small set of parameters associated with a current video frame (small compared to the current video frame) in place of the current video frame, so that the set of parameters can be used at the receiving device to search a database of previously stored video frames for similar object content. The video frame with the most similar face content can then be used to replace the current video frame on the receiving device to provide a smoother display of the video transmission.

Exemplary Device Architecture

FIG. 4 is a block diagram of an exemplary architecture of a device that implements the features and processes described in reference to FIGS. 1 and 2.

Architecture 400 can be implemented in any device, including but not limited to portable or desktop computers, smart phones and electronic tablets, television systems, game consoles, kiosks and the like. Architecture 400 can include memory interface 402, data processor(s), image processor(s) or central processing unit(s) 404, and peripherals interface 406. Memory interface 402, processor(s) 404 or peripherals interface 406 can be separate components or can be integrated in one or more integrated circuits. The various components described above can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate orientation, lighting, and proximity functions of the device. For example, in some implementations, light sensor 412 can be utilized to facilitate adjusting the brightness of touch surface 446. In some implementations, motion sensor 410 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 406, such as a temperature sensor, a biometric sensor, or other sensing device, to facilitate related functionalities.

Location processor 415 (e.g., GPS receiver) can be connected to peripherals interface 406 to provide geo-positioning. Electronic magnetometer 416 (e.g., an integrated circuit chip) can also be connected to peripherals interface 406 to provide data that can be used to determine the direction of magnetic North. Thus, electronic magnetometer 416 can be used as an electronic compass.

Camera subsystem 420 and an optical sensor 422, e.g., a charged coupled device (CCD) or a complementary metaloxide semiconductor (CMOS) optical sensor, can be utilized to facilitate camera functions, such as recording photographs and video clips.

Communication functions can be facilitated through one or more communication subsystems 424. Communication subsystem(s) 424 can include one or more wireless communication subsystems. Wireless communication subsystems 424 can include radio frequency receivers and transmitters and/or optical (e.g., infrared) receivers and transmitters. Wired communication subsystems 424 can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 424 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3 G networks), code division multiple access (CDMA) networks, and a Bluetooth™ network. Communication subsystems 424 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 426 can be coupled to a speaker 428 and one or more microphones 430 to facilitate voice-enabled functions, such as voice recognition, voice replication, digital recording, and telephony functions.

I/O subsystem 440 can include touch controller 442 and/or other input controller(s) 444. Touch controller 442 can be coupled to a touch surface 446. Touch surface 446 and touch controller 442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 can display virtual or soft buttons and a virtual keyboard, which can be used as an input/output device by the user.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In some implementations, device 400 can present recorded audio and/or video files, such as MP3, AAC, and MPEG files. In some implementations, device 400 can include the functionality of an MP3 player and may include a pin connector for tethering to other devices. Other input/output and control devices can be used.

Memory interface 402 can be coupled to memory 450. Memory 450 can include high-speed random access memory or non-volatile memory, such as one or more magnetic disk storage devices, one or more optical storage devices, or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers or servers. Communication instructions 454 can also be used to select an operational mode or communication medium for use by the device, based on a geographic location (obtained by the GPS/Navigation instructions 468) of the device. Memory 450 may include graphical user interface instructions 456 to facilitate graphic user interface processing, such as generating and displaying the various user interfaces and user interface elements; sensor processing instructions 458 to facilitate sensor-related processing and functions; phone instructions 460 to facilitate phone-related processes and functions; electronic messaging instructions 462 to facilitate electronic-messaging related processes and functions, including instructions for implementing an e-mail application or text messaging application; web browsing instructions 464 to facilitate web browsing-related processes and functions, including facilitating communication with services (e.g., video conferencing service); media processing instructions 466 to facilitate media processing-related processes and functions; GPS/Navigation instructions 468 to facilitate GPS and navigation-related processes; camera instructions 470 to facilitate camera-related processes and functions; and other instructions 472, such as instructions to implement content-based frame search, as described in reference to FIGS. 1-3. The memory 450 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a receiving device, a set of parameters or coefficients associated with a current video frame of a video transmission from a transmitting device, the set of parameters or coefficients generated from locations of object landmark points characterizing object content in the current video frame, wherein the receiving device receives the set of parameters or coefficients without the current video frame;
   performing, by the receiving device, a search, using the set of parameters or coefficients, of a data structure storing previously received video frames of the video transmission;
   retrieving, by the receiving device, a previously stored video frame containing similar object content of the current video frame based on performing the search of the data structure; and
   displaying, by the receiving device, the retrieved video frame in place of the current video frame.

2. The method of claim 1, further comprising:
   morphing, by the receiving device, the object content in the retrieved video frame before displaying the retrieved video frame in place of the current video frame.

3. The method of claim 2, wherein morphing further comprises: obtaining, by the receiving device, a stored set of parameters or coefficients that are associated with the object content of the retrieved video frame; and
   generating meshes of landmark points from both the set of parameters or coefficients and the stored set of parameters or coefficients to morph the object content in the retrieved video frame.

4. The method of claim 1, wherein the set of parameters or coefficients are generated from the object landmark points using principal component analysis.

5. A method comprising
   identifying, by the transmitting device, locations of object landmark points characterizing object content in a current video frame of a video transmission;
   generating parameters or coefficients from the locations of the object landmark points;
   determining a current bandwidth condition associated with the video transmission;
   transmitting the parameters or coefficients to a receiving device without the current video frame based upon the determination that the current bandwidth condition satisfies a low bandwidth condition, wherein the parameters or coefficients are relatively smaller data sizes than the current video frame; and transmitting the parameters or coefficients to the receiving device with the current video frame based upon the determination that the current bandwidth condition does not satisfy the low bandwidth condition.

6. The method of claim 5, further comprising:
compressing the video frame using context-sensitive lossy compression.

7. The method of claim 5, further comprising:
using locations of the object landmark points to segment background content of the current video frame from the object content of the current video frame; and
transmitting the background content and the object content of the current video frame to the receiving device, wherein the background content is at a lower resolution than the object content.

8. A system comprising:
one or more processors;
memory coupled to the one or more processors and configured for storing instructions, which, when executed by the one or more processors, causes a receiving device to:
receive a set of parameters or coefficients associated with a current video frame of a video transmission from a transmitting device, the set of parameters or coefficients are indicative of locations of object landmark points characterizing object content in the current video frame, wherein the receiving device receives the set of parameters or coefficients without the current video frame;
perform a search, using the set of parameters or coefficients, of a data structure storing previously received video frames of the video transmission from the transmitting device;
retrieve a previously stored video frame containing similar object content of the current video frame determined from the search of the data structure; and
display the retrieved video frame in place of the current video frame.

9. The system of claim 8, wherein the instructions further cause the receiving device to:
morph the object content in the retrieved video frame before displaying the retrieved video frame.

10. The system of claim 9, wherein the instructions to morph further comprise instructions to:
obtain a stored set of parameters or coefficients that are associated with the object content of the retrieved video frame; and
generate meshes of landmark points from both the set of parameters or coefficients and the stored set of parameters or coefficients to morph the object content in the retrieved video frame.

11. The system of claim 8, wherein the set of parameters or coefficients are generated from the object landmark points using principal component analysis.

12. A system comprising:
one or more processors;
memory coupled to the one or more processors and configured for storing instructions, which, when executed by the one or more processors, causes a transmitting device to:
identify, locations of object landmark points characterizing object content in a current video frame of a video transmission;
generate parameters or coefficients indicative of locations of the object landmark points;

determine a current bandwidth condition associated with the video transmission;
transmit the parameters or coefficients to a receiving device without the current video frame based upon the determination that the current bandwidth condition satisfies a low bandwidth condition, wherein the parameters or coefficients are relatively smaller data sizes than the current video frame; and
transmit the parameters or coefficients to the receiving device with the current video frame based upon the determination that the current bandwidth condition does not satisfy the low bandwidth condition.

13. The system of claim 12, wherein the instructions further transmitting device to:
compress the video frame using context-sensitive lossy compression.

14. The system of claim 12, wherein the instructions further cause the transmitting device to:
use locations of the object landmark points to segment background content of the current video frame from the object content of the current video frame; and
transmit the background content and the object content of the current video frame to the receiving device, wherein the background content is transmitted at a lower resolution than the object content.

15. A non-transitory computer-readable storage medium configured for storing instructions, which, when executed by one or more processors, causes a receiving device to:
receive a set of parameters or coefficients associated with a current video frame of a video transmission from a transmitting device, the set of parameters or coefficients are indicative of locations of object landmark points characterizing object content in the current video frame, wherein the receiving device receives the set of parameters or coefficients without the current video frame;
perform a search, using the set of parameters or coefficients, of a data structure storing previously received video frames of the video transmission;
retrieve a previously stored video frame containing similar object content of the current video frame from the search of the data structure; and
display the retrieved video frame in place of the current video frame.

16. The computer-readable medium of claim 15, wherein the instructions further cause the receiving device to:
morph the object content in the retrieved video frame before displaying the retrieved video frame.

17. The computer-readable medium of claim 16, wherein the instructions to morph further comprise instructions to:
obtain a stored set of parameters or coefficients that are associated with the object content of the retrieved video frame; and
generate meshes of landmark points from both the set of parameters or coefficients and the stored set of parameters or coefficients to morph the object content in the retrieved video frame.

18. The computer-readable medium of claim 15, wherein the set of parameters or coefficients are generated from the object landmark points using principal component analysis.

19. A non-transitory computer-readable storage medium configured for storing instructions, which, when executed by one or more processors, causes a transmitting device to:
identify, locations of object landmark points characterizing object content in a current video frame of a video transmission;

generate parameters or coefficients indicative of locations of the object landmark points;

determine a current bandwidth condition associated with the video transmission; and transmit the parameters or coefficients to a receiving device without the current video frame when the determined current bandwidth condition satisfies a low bandwidth condition, wherein the parameters or coefficients are relatively smaller data sizes than the current video frame; and transmit the parameters or coefficients to the receiving device with the current video frame based upon the determination that the current bandwidth condition does not satisfy the low bandwidth condition.

20. The computer-readable medium of claim 19, wherein the instructions further cause the transmitting device to:

compress the video frame using context-sensitive lossy compression.

21. The computer-readable medium of claim 19, wherein the instructions further cause the transmitting device to:

use locations of the object landmark points to segment background content of the current video frame from the object content of the current video frame; and transmit the background content and the object content of the current video frame to the receiving device, wherein the background content is at a lower resolution than the object content.

\* \* \* \* \*